United States Patent [19]

Nation

[11] 3,712,604
[45] Jan. 23, 1973

[54] MECHANICAL SPRING CONSTANT LOAD DEVICE
[75] Inventor: Melvin S. Nation, Bensenville, Ill.
[73] Assignee: Motorola, Inc., Franklin Park, Ill.
[22] Filed: April 26, 1971
[21] Appl. No.: 137,285

[52] U.S. Cl. ..................267/161, 178/7.8, 192/89
[51] Int. Cl. ...............................................F16f 1/34
[58] Field of Search .....267/161, 47; 192/89; 178/7.8

[56] References Cited

UNITED STATES PATENTS 3,235,049 2/1966 Hufstader..............................192/89

Primary Examiner—James B. Marbert
Assistant Examiner—Richard A. Bertsch
Attorney—Mueller & Aichele

[57] ABSTRACT

A spring member having conically extending resilient fingers which bear against a disc provides a constant load to a shaft coupled to the disc in the presence of movement of the shaft from a fixed axial position. The constant load device can be used in many mechanical applications such as an automobile chassis spring or a spring for a friction clutch. The constant load device can also be used in electronic applications, such as for holding a vidicon in assembled position with an electron intensifier.

9 Claims, 4 Drawing Figures

PATENTED JAN 23 1973　　　　　　　　　　　　　3,712,604

INVENTOR

MELVIN S. NATION

BY

*Mueller & Aichele*

ATTYS.

MECHANICAL SPRING CONSTANT LOAD DEVICE

BACKGROUND OF THE INVENTION

There are many applications in which it is desired to provide constant load or pressure on a shaft to hold the same in given position, to support a device, and/or to provide shock absorbing action. A problem is presented wherein such load is to be applied to a shaft which is not always in the same axial position in that the load applied may be varied as the axial position of the shaft changes. Many spring structures cannot be used in applications where changes in the axial position of the shaft take place.

SUMMARY OF THE INVENTION

It is, therefore, an object of the present invention to provide a device for applying a constant load to a shaft, which is of simple and inexpensive construction.

Another object of the invention is to provide a constant load device for a shaft which maintains a constant pressure thereto throughout a range of center axis displacements.

A feature of the invention is the provision of a constant load device including a conical cantilever beam spring which cooperates with the circular edge of a button or plate coupled to a shaft to provide a load on the shaft, with the load remaining substantially constant in the presence of lateral movement of the button attendant to displacement of the axis of the shaft. The button may be made of plastic material and have some resiliency, and the conical cantilever beam spring may include a plurality of conically positioned resilient fingers which extend at an angle with respect to the plastic button.

Another feature of the invention is the provision of a constant load device which is adapted to hold an electron device, such as a vidicon, in optical face contact with another device, such as an image intensifier, and which includes a button coupled to the end of the neck of the vidicon and having a load applied thereto by a conical spring structure. The spring structure has a plurality of resilient fingers engaging the edge of the button and applying a substantially constant load thereto as the position of the button changes because of a shift of the center axis of the vidicon tube.

DESCRIPTION OF THE PREFERRED EMBODIMENTS

Figure 1:
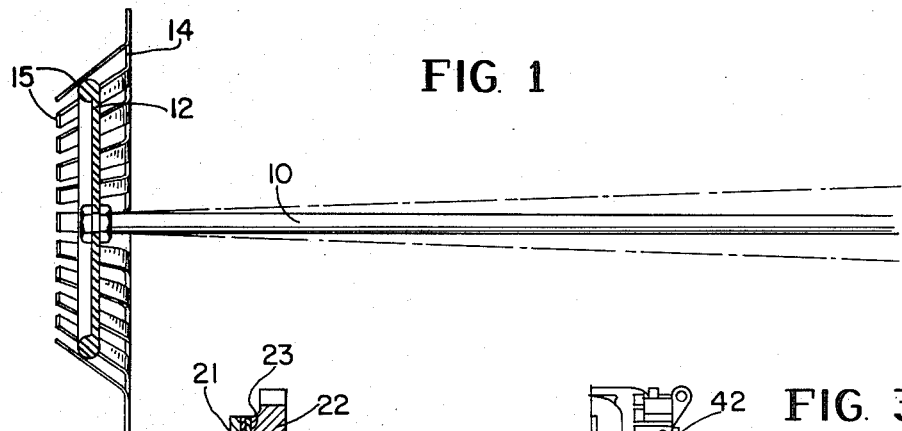
FIG. 1 is a schematic illustration of the constant load device on the invention.

In FIG. 1 there is illustrated a shaft 10 having an axis shown in its center position, with axial positions to which the shaft may move shown by dot-dash lines. Connected to one end of the shaft is a plate or button 12 having a circular edge. The circular edge of the button engages fingers of a conical cantilever beam spring structure 14 having an outer edge which may be supported in any suitable manner. The spring structure 14 may be constructed of a metal such as beryllium copper. The spring fingers 15 individually bear against the circular edge of the button 12 to provide a loading on the shaft 10. The button can be constructed of a plastic material having some resilience, such as the acetal resin material known as DELRIN, made by E.I. DuPont de Nemours and Company, Wilmington, Del. As indicated by the dot-dash line, the shaft can move through a limited angle from its center axis. This will cause the plane of the plate 12 to change. However, the engagement of the fingers 15 against the edge of the plate 12 will result in a substantially constant load on the shaft 10 as the shaft moves through this limited angular range.

Figure 2:
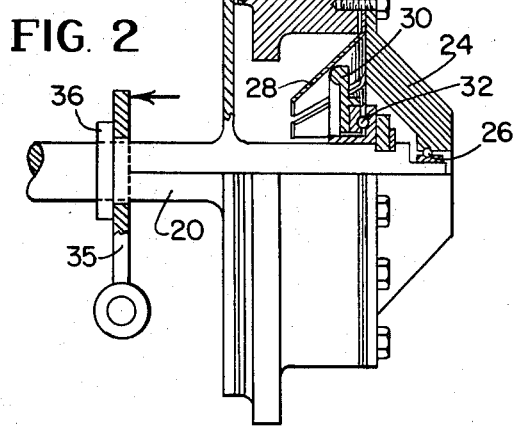
FIG. 2 illustrates a friction clutch utilizing the constant load device of the invention.

FIG. 2 illustrates the use of the constant load device of the invention in a friction clutch. The clutch couples an axle or drive shaft 20 to a gear 22. The shaft 20 has a radially extending flange having a surface 21 which engages an annular clutch surface 23 projecting from the gear 22. Known friction clutch material may be provided on one or both of the engaging faces of the flange 21 and the projecting portion 23 of the gear 22. Secured to the gear 22 is an end plate 24 in which the end of the shaft 20 is supported by bearing 26. A conical cantilever beam spring 28 is also secured to the gear 22, and is of generally the same configuration as the spring 14 of FIG. 1. An annular disc or button 30 bears against the fingers of the spring 28, in the same manner illustrated in FIG. 1. The disc 30 is supported by bearing 32 supported on the shaft 20.

The spring 28 bears against the disc 30 to hold the annular friction engaging surfaces of the parts 21 and 23 in engagement, so that the gear 22 moves with the shaft 20. To disengage the clutch, pivoted arm 35 engages rim 36 on the shaft 20 to pull the shaft axially in the direction to move the flange 21 away from the projecting surface 23. This removes the driving connection between the shaft 20 and the gear 23. To do this, the plate 30 causes the fingers of spring 28 to flex. The bearings 26 and 32 permit the shaft to rotate 20 with respect to the end plate 24 connected to the gear 22 and with respect to the plate 30, when the clutch is disengaged by action of the pivoted arm 35.

When the axial force on the shaft 20 is released, the fingers of the string 28 bearing against the plate 30 will pull shaft 20 in the direction to cause the flange 21 to engage the projecting surface 23 on the gear 22, so that movement of the shaft 20 will drive the gear 22.

Figure 3:
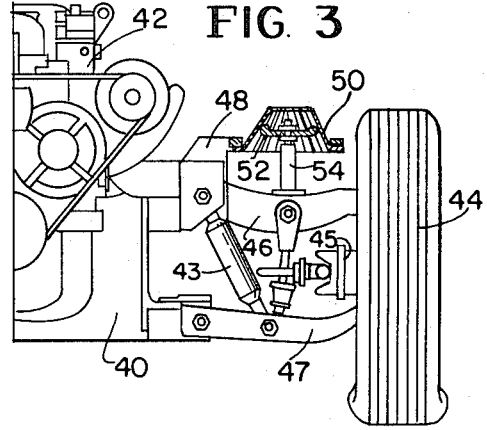
FIG. 3 illustrates a front suspension for an automobile utilizing the load device of the invention.

FIG. 3 shows another application in which the constant load device can be used. This shows the front suspension of an automobile which has a chassis 40 supporting an engine 42. A wheel 44 is connected to the chassis by upper and lower driving arms 46 and 47. A shock absorber 43 may be connected between the lower driving arm 47 and the chassis 40. The wheel 44 is rotatable on an axle 45 which is secured to the upper and lower driving arms by structure which is well known and not shown. Provisions for steering can also be connected to the axle 45.

The chassis 40 has a bracket 48 which supports the edge of the conical cantilever beam spring 50, which is similar to the spring 14 of FIG. 1. Engaging the fingers of the spring 50 is disc 52, which is secured to shaft 54. The lower end of the shaft 54 is conducted to the upper driving arm 46. Accordingly, the weight of the chassis applied to the edge of the conical spring 50 causes the spring to apply pressure to the disc 52. The spring 50 and the disc 52, which can have some resilience, therefore form a spring support for the chassis. In this construction, it will be apparent that as the upper and lower driving arms move, the position of the axis of shaft 54 will change so that the disc 52 will shift with respect to the conical fingers of spring 50. This however, will not result in a substantial change in the spring pressure which supports the chassis.

Figure 4:
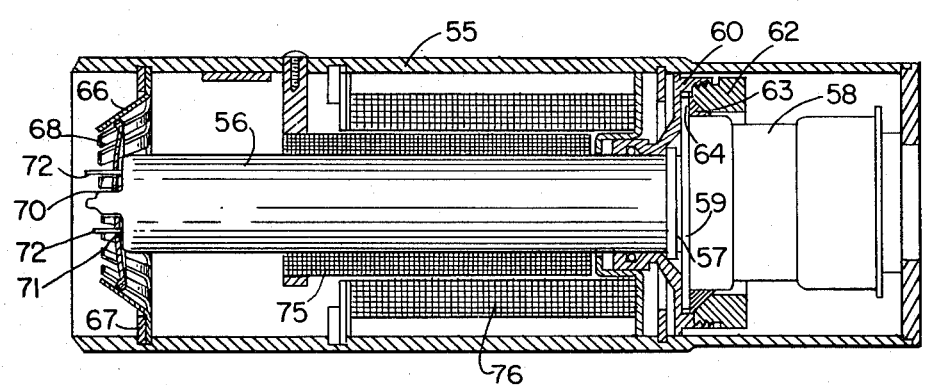
FIG. 4 shows a vidicon tube held against an image intensifier by means of the constant load device of the invention.

FIG. 4 illustrates the application of the invention to a structure for supporting a vidicon tube to an image intensifier unit. The structure includes a tubular housing 55 in which the vidicon tube 56 and the intensifier 58 are housed. The vidicon tube 56 has a transparent end plate 57 which is held in flush engagement with a transparent plate 59 on the intensifier. The intensifier is held in the housing 55 by threaded engagement between annular members 60 and 62 which force the split ring 63 in engagement with rim 64 on the intensifier. A deflection coil 75 and a focus coil 76 are supported in the housing 55 and positioned about the vidicon tube 56 in a well known manner to provide deflection of the beam thereof. The structure shown in FIG. 4 is suitable for use in a television camera wherein the image is intensified and then converted into electrical signals.

The conical beam spring 66 engages the circular edge of button or plate 68, which in turn is coupled to the end of the vidicon tube 56 opposite to the face plate 57. The spring 66 is held in a groove in the housing 55, and is supported by a clamping ring 67. The plate 68 has a center opening 70 for the center projection on the vidicon tube, and openings 71 thereabout for receiving the terminals 72 extending from the vidicon tube. The spring 66 and plate 68 cooperate to provide a loading of the face plate 57 of the vidicon tube 56 against the plate 59 on the intensifier. This holds the two surfaces in flux engagement and will provide the desired loading even if the vidicon axis is not precisely in line with the axis of the intensifier.

As previously stated, the plate 68 may be made of plastic insulating material which has some resilience, such as DELRIN. As illustrated in FIG. 4, the plate 68 is bowed or cupped somewhat by the pressure of the spring fingers of the conical spring 66 against the circular edge thereto. The spring 66 can be constructed of a sheet of beryllium copper 0.015 inch thick, and BERYLCO 25 manufactured by Beryllium Corporation (Box 1462), Reading, Pa., can be used. In the structure shown in FIG. 4, the outside diameter of the flat edge of spring 66 may be 2.75 inches, the diameter at the base of the conical fingers 2.25 inches, and the height of the fingers 0.45 inch above the flat edge. The fingers extend at an angle of 45°. The diameter of the plate 68 is 1.87 inches and the thickness is 0.04 inch, with the edge or rim having a thickness of 0.12 inch.

The structure which has been described has been found to provide a substantially constant load on a shaft or tubular member which finds many applications. As illustrated, it can be used to hold members in frictional engagement, provide a spring support for a structure, and hold a surface of a device in flush engagement with another device.

I claim:

1. A device for applying a substantially fixed axial load to a shaft which is subject to movement from a fixed axial position, including in combination,
   means for supporting the shaft and permitting limited axial movement thereof,
   plate means adapted to be connected to the shaft and extending substantially at right angle thereto, and
   spring means including a plurality of symmetrically positioned spring fingers forming a concave structure and engaging said plate means, each of said fingers being resilient and extending at an angle with respect to the plane of said plate means at the point of engagement therewith to permit limited lateral movement of said plate means and apply a substantially constant load to the shaft.

2. A device in accordance with claim 1 wherein said plate means is a disc having a circular edge, and said spring means is of conical cantilever beam spring.

3. A device in accordance with claim 2 wherein said plate means is formed of plastic material and said spring means is formed of beryllium copper.

4. The device of claim 3 wherein said frame means forms a portion of a chassis of an automobile, and said shaft is adapted to be connected to the suspension of the automobile, with said spring means and said plate means forming a resilient support for said chassis.

5. A spring mounting device including in combination,
   frame means,
   a shaft supported for limited axial movement with respect to said frame means,
   a conical cantilever beam spring having a circular edge secured to said frame means and resilient spring fingers, and
   plate means connected to said shaft and extending at substantially right angles thereto, said plate means having a circular edge engaging said spring fingers on the concave side of said spring, with said fingers applying spring pressure thereagainst.

6. The device of claim 5 wherein said frame includes a gear portion and a clutch portion and said shaft has a flange having a clutch portion adapted to engage said clutch portion of said frame means, with the spring pressure between said spring fingers and said plate means holding said clutch portion of said flange into engagement with said clutch portion of said frame means.

7. A spring mounting device in accordance with claim 5 wherein, said shaft is a vidicon tube, and said plate means is an insulating resilient button having center portion adapted to engage the end of said vidicon tube.

8. A spring mounting device in accordance with claim 5 wherein, said frame means includes a housing having means therein defining a surface, said shaft is a vidicon tube having a surface adapted to be held flush with said surface within said frame means and an opposite end, and said plate means is an insulating button having a center portion in engagement with said opposite end of said vidicon tube.

9. The structure of claim 8 wherein said circular edge of said spring is substantially flat and said spring fingers extend at an angle of the order of 45° from said edge.

* * * * *